US012632325B2

(12) United States Patent
Bronson et al.

(10) Patent No.: US 12,632,325 B2
(45) Date of Patent: May 19, 2026

(54) LIMITING EFFECTS OF UNCORRECTED HARD FAILURES IN LEAST RECENTLY USED VECTOR

(71) Applicant: International Business Machines Corporation, Armonk, NY (US)

(72) Inventors: Timothy Bronson, Round Rock, TX (US); Ashraf ElSharif, Austin, TX (US); Saul Bernaber, Milford, CT (US); Eric Joel Rivera De Jesus, Austin, TX (US); Sajid Khan, Sugar Land, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/918,987

(22) Filed: Oct. 17, 2024

(65) Prior Publication Data

US 2026/0111298 A1 Apr. 23, 2026

(51) Int. Cl.
*G06F 11/00* (2006.01)
*G06F 11/07* (2006.01)

(52) U.S. Cl.
CPC .......... *G06F 11/076* (2013.01); *G06F 11/073* (2013.01)

(58) Field of Classification Search
CPC ................. G06F 11/076; G06F 11/073; G06F 2015/765; G06F 12/123
See application file for complete search history.

(56) References Cited

U.S. PATENT DOCUMENTS

| | | | |
|---|---|---|---|
| 6,718,439 B1 * | 4/2004 | Jayavant | G06F 12/0864 711/E12.043 |
| 9,971,713 B2 | 5/2018 | Asaad et al. | |
| 10,521,357 B1 | 12/2019 | Ramey et al. | |
| 2004/0030957 A1 * | 2/2004 | Yadavalli | G06F 11/076 714/E11.004 |

(Continued)

FOREIGN PATENT DOCUMENTS

DE        68923694 T2        4/1996

OTHER PUBLICATIONS ip.com, "A Mechanism for Detecting, and Correcting, Incorrect Filing Caused by Drag and Drop Errors," IP.com No. IPCOM000259501DF, Aug. 15, 2019, pp. 1-3.

(Continued)

*Primary Examiner* — Joseph D Manoskey
(74) *Attorney, Agent, or Firm* — Shackelford, McKinley & Norton, LLP; Robert A. Voigt, Jr.

(57) ABSTRACT

A computer-implemented method, system, and computer program product for limiting the effects of uncorrected hard errors. A soft error is detected in the least recently used (LRU) vector. A group at the tier of the LRU vector subject to the error is then recorded. A counter tracking the number of soft errors involving the group at the tier of the LRU vector subject to the soft error is updated (e.g., increased by a value of 1). If the value of the counter exceeds a threshold value, then such a soft error is deemed to be treated as a hard error. In such a situation, an error correction process is implemented for only the affected location of the LRU vector subject to the soft error. The target way is then set to include the most recently used data item in the non-errant associated groups of the LRU vector.

20 Claims, 7 Drawing Sheets

(56) References Cited

U.S. PATENT DOCUMENTS

| 2010/0268984 | A1* | 10/2010 | Guthrie | ............... G06F 12/0802 |
| | | | | 714/49 |
| 2010/0274974 | A1* | 10/2010 | Van De Waerdt | .... G06F 12/127 |
| | | | | 345/557 |
| 2020/0371927 | A1 | 11/2020 | Chachad et al. | |
| 2020/0371935 | A1 | 11/2020 | Chachad et al. | |
| 2023/0305924 | A1* | 9/2023 | Nemati | ................. G06F 11/076 |

OTHER PUBLICATIONS ip.com, "An Optimization for Least-Recently-Used Cache Management," IP.com No. IPCOM000197227D, Jun. 29, 2010, pp. 1-6.
ip.com, "Avoiding Deadlocks in a Multi-Processor Environment with a First Level Cache Using a Logical Directory," IP.com No. IPCOM000271077D, Oct. 12, 2022, pp. 1-4.
Leng et al., "SoftCorrect: Error Correction with Soft Detection for Automatic Speech Recognition," arXiv:2212.01039v2, Dec. 20, 2023, pp. 1-12.
Liao et al., "Automated Estimation of Vector Error Correction Models," Oct. 2012, pp. 1-74.
Hui Chen, "Error Detection and Correction," CUNY Brooklyn College, Brooklyn, NY, USA, Sep. 11, 2023, pp. 1-31.
Transmitter Letter dated Oct. 10, 2024, one page.

* cited by examiner

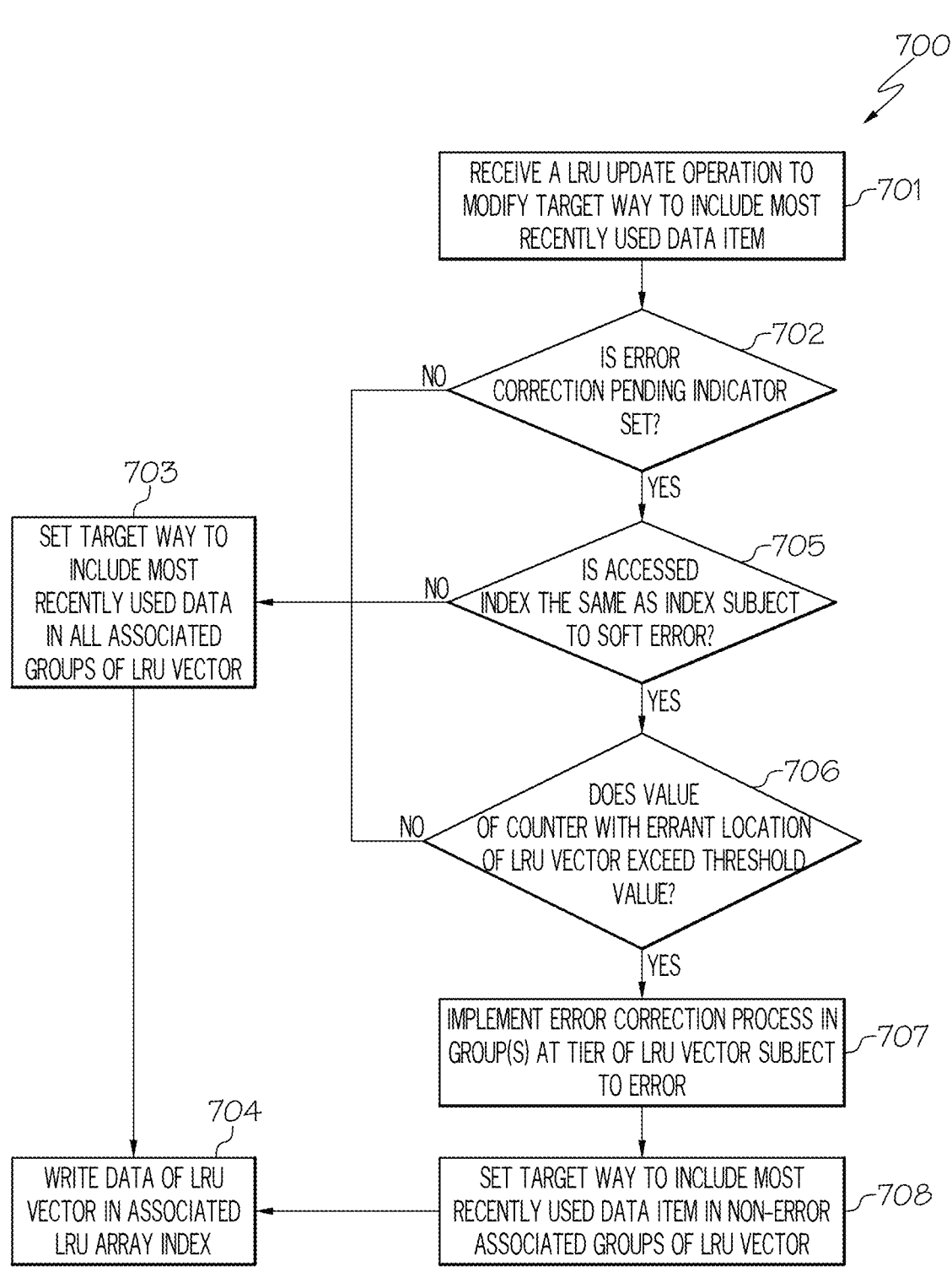

700

RECEIVE A LRU UPDATE OPERATION TO MODIFY TARGET WAY TO INCLUDE MOST RECENTLY USED DATA ITEM — 701

IS ERROR CORRECTION PENDING INDICATOR SET? — 702

NO

YES

703

SET TARGET WAY TO INCLUDE MOST RECENTLY USED DATA IN ALL ASSOCIATED GROUPS OF LRU VECTOR

IS ACCESSED INDEX THE SAME AS INDEX SUBJECT TO SOFT ERROR? — 705

NO

YES

DOES VALUE OF COUNTER WITH ERRANT LOCATION OF LRU VECTOR EXCEED THRESHOLD VALUE? — 706

NO

YES

IMPLEMENT ERROR CORRECTION PROCESS IN GROUP(S) AT TIER OF LRU VECTOR SUBJECT TO ERROR — 707

704

WRITE DATA OF LRU VECTOR IN ASSOCIATED LRU ARRAY INDEX

SET TARGET WAY TO INCLUDE MOST RECENTLY USED DATA ITEM IN NON-ERROR ASSOCIATED GROUPS OF LRU VECTOR — 708

FIG. 7

LIMITING EFFECTS OF UNCORRECTED HARD FAILURES IN LEAST RECENTLY USED VECTOR

TECHNICAL FIELD

The present disclosure relates generally to least recently used (LRU) mechanisms, and more particularly to limiting the effects of uncorrected hard failures in the LRU vector.

BACKGROUND

The Least Recently Used (LRU) mechanism is a caching algorithm that removes the least recently used items from a cache (hardware or software component that stores data so that future requests for that data can be served faster) to make room for new data. This is done by keeping a list of items in the cache, with the most recently used items at the front and the least recently used items at the back. When the cache is full and a new item needs to be added, the item at the back of the list is removed and the new item is added to the front.

SUMMARY

In one embodiment of the present disclosure, a computer-implemented method for limiting the effects of uncorrected hard errors comprises detecting a soft error in a least recently used (LRU) vector. The method further comprises recording a group at a tier of the LRU vector subject to the soft error. The method additionally comprises updating a counter tracking a number of soft errors involving the group at the tier of the LRU vector. Furthermore, the method comprises implementing an error correction process only for the group at the tier of the LRU vector subject to the soft error in response to a value of the counter exceeding a threshold value. Additionally, the method comprises setting a target way to include a most recently used data item in non-error associated groups of the LRU vector.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 7 is a flowchart of a method for the LRU vector update with error correction in accordance with an embodiment of the present disclosure.

DETAILED DESCRIPTION

Figure 1:
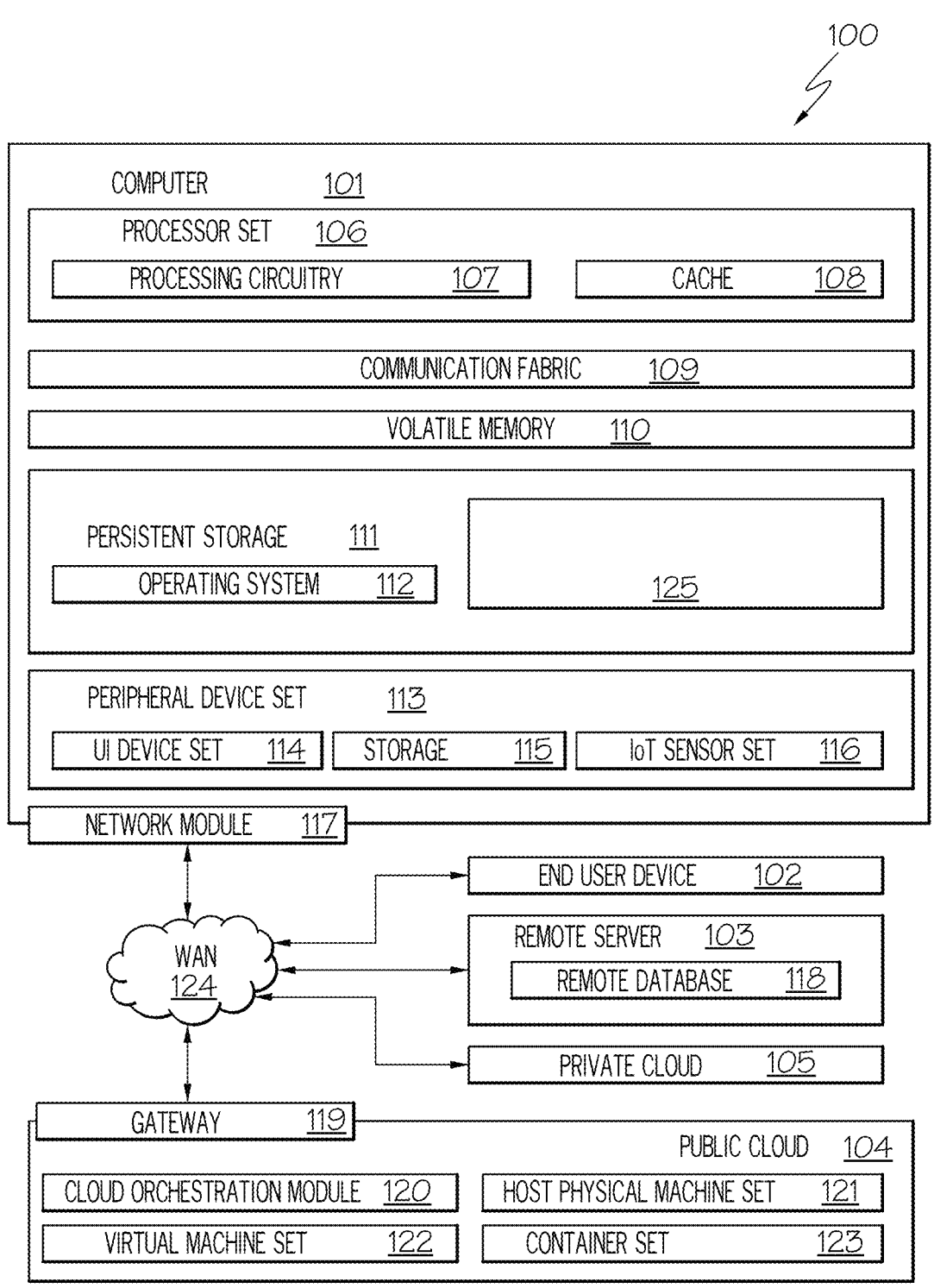
FIG. 1 illustrates an embodiment of the present disclosure of a computing environment for practicing the principles of the present disclosure.

As stated above, the Least Recently Used (LRU) mechanism is a caching algorithm that removes the least recently used items from a cache (hardware or software component that stores data so that future requests for that data can be served faster) to make room for new data. This is done by keeping a list of items in the cache, with the most recently used items at the front and the least recently used items at the back. When the cache is full and a new item needs to be added, the item at the back of the list is removed and the new item is added to the front.

There are various types of caches, such as a set-associative cache. A set-associative cache is a cache that is split into "sets" of cache entries or cache lines. Each set may have one or more "ways," where each way is a single cache entry. A multi-way cache is a type of cache memory that allows a memory address to be mapped to multiple ways within the cache.

LRU mechanisms are fault tolerant (system's ability to continue operating normally even when a fault occurs) as long as an entry in the cache is selected for eviction and any error correction mechanism does not tend to repeatedly select a single or small subset of the ways in the multi-way set-associative cache. An error correction mechanism is a method for detecting and correcting errors, including errors in an LRU vector tracking the age of the ways (duration of time data associated with the ways was last requested) of the set-associative cache.

For example, an error correction mechanism may detect a "soft" error, such as a no-select scenario in which encodings as to the ages of the ways of the multi-way set-associative cache with respect to each other are in error. Soft errors, also known as transient errors, stem from incorrect data or signal states due to external disturbances. Such an error is corrected by writing 0's or some other constant for the bit values of the LRU vector to refresh a potential soft error. A problem occurs if there is a hard error in the LRU vector that is repeatedly detected and corrected with the same pattern (e.g., writing 0's for the bit values of the LRU vector). Hard errors, also referred to as permanent errors, may result from actual damage, such as a broken transistor or a stuck-at fault in a signal. In such a scenario, every other access to the affected index (used to identify which location of the LRU vector is associated with a particular way of the multi-way set-associative cache) will result in the selection for the same set identifier. Such a problem is exacerbated if the hard failure is a bit line defect thereby affecting multiple indices. By repeatedly writing the same pattern at the same location in the LRU vector to attempt to cure soft errors, the set associativity (a given source address maps to one of N unique locations) of the cache is limited over time.

The embodiments of the present disclosure provide a means for limiting the effects of uncorrected hard errors in the LRU vector. In one embodiment, a soft error, such as a soft-fail error, is detected in one of the multi-way LRUs. For example, such a soft error may correspond to a no-select error in which the encodings as to the ages of the ways of the multi-way set-associative cache with respect to each other are in error, including the way containing the requested data. The group at the tier of the LRU vector subject to the soft error is recorded. In one embodiment, the LRU vector for the multi-way set-associative cache contains a series of bits to identify each of the ways in the multi-way associative cache. Such ways may be identified via a tiered or hierarchical LRU vector, in which "groups" of bits at specific tiers of the LRU vector are used to identify specific ways of the multi-way set-associative cache. Furthermore, upon detecting a soft error, a counter tracking the number of soft errors associated with the group at the tier of the LRU vector subject to the soft error is updated (e.g., increased by one). In one embodiment, in response to receiving an LRU update operation to modify the target way to include the most recently used data item, a determination is made as to whether the value of the counter for the group(s) at a tier of the LRU vector associated with the target way exceeds a threshold value. If the value of the counter for the group at the tier of the LRU vector associated with the target way exceeds the threshold value, then such a portion of the LRU vector is assumed to be subject to a hard error (as opposed to simply a soft error) and an error correction process is pursued for only that location. For instance, an error correction process is pursued only for such a location, such as writing a constant pattern (e.g., zeros) for such a group subject to the error. The most recently used update is then applied to the remaining non-error associated groups of the LRU vector. That is, the target way is set to the most recently used data item in the non-error associated groups of the LRU vector. In this manner, the effects of uncorrected hard errors of the LRU vector is limited by only correctively updating the bits of the LRU vector associated with the error deemed to be a hard error as opposed to updating the entirety of the LRU vector (e.g., writing a constant pattern for the bit values of the entire LRU vector) to address the error. A further description of these and other features will be provided below.

In some embodiments of the present disclosure, the present disclosure comprises a computer-implemented method, system, and computer program product for limiting the effects of uncorrected hard errors. In one embodiment of the present disclosure, a soft error is detected in the LRU vector. A group at the tier of the LRU vector subject to the error is then recorded. A counter tracking the number of soft errors involving the errant group of the LRU vector (i.e., involving the group at the tier of the LRU vector subject to the soft error) is updated (e.g., increased by a value of 1). If the value of the counter exceeds a threshold value, then such a soft error is deemed to be treated as a hard error. In such a situation, an error correction process is implemented for only the affected location of the LRU vector. That is, an error correction process is only implemented for the group at the tier of the LRU vector subject to the soft error in response to the value of the counter exceeding the threshold value. For example, a constant pattern (e.g., 0's) is written in the errant group at the tier of the LRU vector to address the error. The target way is then set to include the most recently used data item in the non-errant associated groups of the LRU vector. In this manner, the effects of uncorrected hard errors of the LRU vector is limited by only correctively updating the bits of the LRU vector associated with the error deemed to be a hard error as opposed to updating the entirety of the LRU vector (e.g., writing a constant pattern for the bit values of the entire LRU vector) to address the error.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a computing environment 100 for practicing the principles of the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code (stored in block 125) involved in performing the inventive methods, such as limiting the effects of uncorrected hard errors in the LRU vector. In addition to block 125, computing environment 100 includes, for example, computer 101, network 124, such as a wide area network (WAN), end user device (EUD) 102, remote server 103, public cloud 104, and private cloud 105. In this embodiment, computer 101 includes processor set 106 (including processing circuitry 107 and cache 108), communication fabric 109, volatile memory 110, persistent storage 111 (including operating system 112 and block 125, as identified above), peripheral device set 113 (including user interface (UI) device set 114, storage 115, and Internet of Things (IoT) sensor set 116), and network module 117. Remote server 103 includes remote database 118. Public cloud 104 includes gateway 119, cloud orchestration module 120, host physical machine set 121, virtual machine set 122, and container set 123.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 118. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 106 includes one, or more, computer processors of any type now known or to be developed in the future. Processing circuitry 107 may be distributed over multiple packages, for example, multiple, coordinated integrated circuit chips. Processing circuitry 107 may implement multiple processor threads and/or multiple processor cores. Cache 108 is memory that is located in the processor chip package(s) and is typically used for data or code that should be available for rapid access by the threads or cores running on processor set 106. Cache memories are typically organized into multiple levels depending upon relative proximity to the processing circuitry. Alternatively, some, or all, of the cache for the processor set may be located "off chip." In some computing environments, processor set 106 may be designed for working with qubits and performing quantum computing.

Computer readable program instructions are typically loaded onto computer 101 to cause a series of operational steps to be performed by processor set 106 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 108 and the other storage media discussed below. The program instructions, and associated data, are accessed by processor set 106 to control and direct performance of the inventive methods. In computing environment 100, at least some of the instructions for performing the inventive methods may be stored in block 125 in persistent storage 111.

Communication fabric 109 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 110 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 110 is located in a single package and is internal to computer 101, but, alternatively or additionally, the volatile memory may be distributed over multiple packages and/or located externally with respect to computer 101.

Persistent Storage 111 is any form of non-volatile storage for computers that is now known or to be developed in the future. The non-volatility of this storage means that the stored data is maintained regardless of whether power is being supplied to computer 101 and/or directly to persistent storage 111. Persistent storage 111 may be a read only memory (ROM), but typically at least a portion of the persistent storage allows writing of data, deletion of data and re-writing of data. Some familiar forms of persistent storage include magnetic disks and solid state storage devices. Operating system 112 may take several forms, such as various known proprietary operating systems or open source Portable Operating System Interface type operating systems that employ a kernel. The code included in block 125 typically includes at least some of the computer code involved in performing the inventive methods.

Peripheral device set 113 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 114 may include components such as a display screen, speaker, microphone, wearable devices (such as goggles and smart watches), keyboard, mouse, printer, touchpad, game controllers, and haptic devices. Storage 115 is external storage, such as an external hard drive, or insertable storage, such as an SD card. Storage 115 may be persistent and/or volatile. In some embodiments, storage 115 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 116 is made up of sensors that can be used in Internet of Things applications. For example, one sensor may be a thermometer and another sensor may be a motion detector.

Network module 117 is the collection of computer software, hardware, and firmware that allows computer 101 to communicate with other computers through WAN 124.

Network module 117 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 117 are performed on the same physical hardware device. In other embodiments (for example, embodiments that utilize software-defined networking (SDN)), the control functions and the forwarding functions of network module 117 are performed on physically separate devices, such that the control functions manage several different network hardware devices. Computer readable program instructions for performing the inventive methods can typically be downloaded to computer 101 from an external computer or external storage device through a network adapter card or network interface included in network module 117.

WAN 124 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 102 is any computer system that is used and controlled by an end user (for example, a customer of an enterprise that operates computer 101), and may take any of the forms discussed above in connection with computer 101. EUD 102 typically receives helpful and useful data from the operations of computer 101. For example, in a hypothetical case where computer 101 is designed to provide a recommendation to an end user, this recommendation would typically be communicated from network module 117 of computer 101 through WAN 124 to EUD 102. In this way, EUD 102 can display, or otherwise present, the recommendation to an end user. In some embodiments, EUD 102 may be a client device, such as thin client, heavy client, mainframe computer, desktop computer and so on.

Remote server 103 is any computer system that serves at least some data and/or functionality to computer 101. Remote server 103 may be controlled and used by the same entity that operates computer 101. Remote server 103 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 118 of remote server 103.

Public cloud 104 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 104 is performed by the computer hardware and/or software of cloud orchestration module 120. The computing resources provided by public cloud 104 are typically implemented by virtual computing environments that run on various computers making up the computers of host physical machine set 121, which is the universe of physical computers in and/or available to public cloud 104. The virtual computing environments (VCEs) typically take the form of virtual machines from virtual machine set 122 and/or containers from container set 123. It is understood that these VCEs may be stored as images and may be transferred among and between the various physical machine hosts, either as images or after instantiation of the VCE. Cloud orchestration module 120 manages the transfer and storage of images, deploys new instantiations of VCEs and manages active instantiations of VCE deployments. Gateway 119 is the collection of computer software, hardware, and firmware that allows public cloud 104 to communicate through WAN 124.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 105 is similar to public cloud 104, except that the computing resources are only available for use by a single enterprise. While private cloud 105 is depicted as being in communication with WAN 124, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 104 and private cloud 105 are both part of a larger hybrid cloud.

Figure 5:
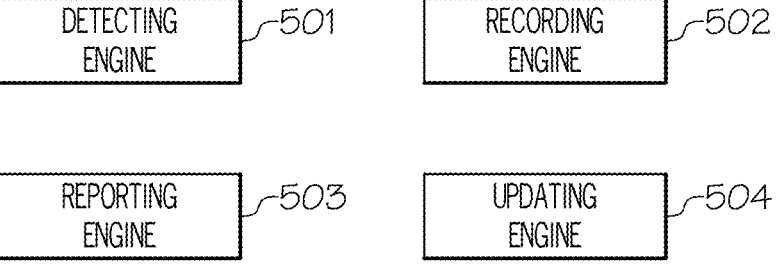
FIG. 5 is a diagram of the software components used by the cache controller to limit the effects of uncorrected hard errors in the LRU vector in accordance with an embodiment of the present disclosure.

Block 125 further includes the software components discussed herein in connection with FIG. 5 to limit the effects of uncorrected hard errors in the LRU vector. In one embodiment, such components may be implemented in hardware. The functions discussed above performed by such components are not generic computer functions. As a result, computer 101 is a particular machine that is the result of implementing specific, non-generic computer functions.

In one embodiment, the functionality of such software components of computer 101, including the functionality for limiting the effects of uncorrected hard errors in the LRU vector, may be embodied in an application specific integrated circuit.

An embodiment of computer 101 implementing a distributed symmetric multiprocessing (SMP) system utilizing a LRU vector to track the age of the ways (duration of time data associated with the ways was last requested) of the multi-way set-associative cache is discussed below in connection with FIG. 2.

Figure 2:
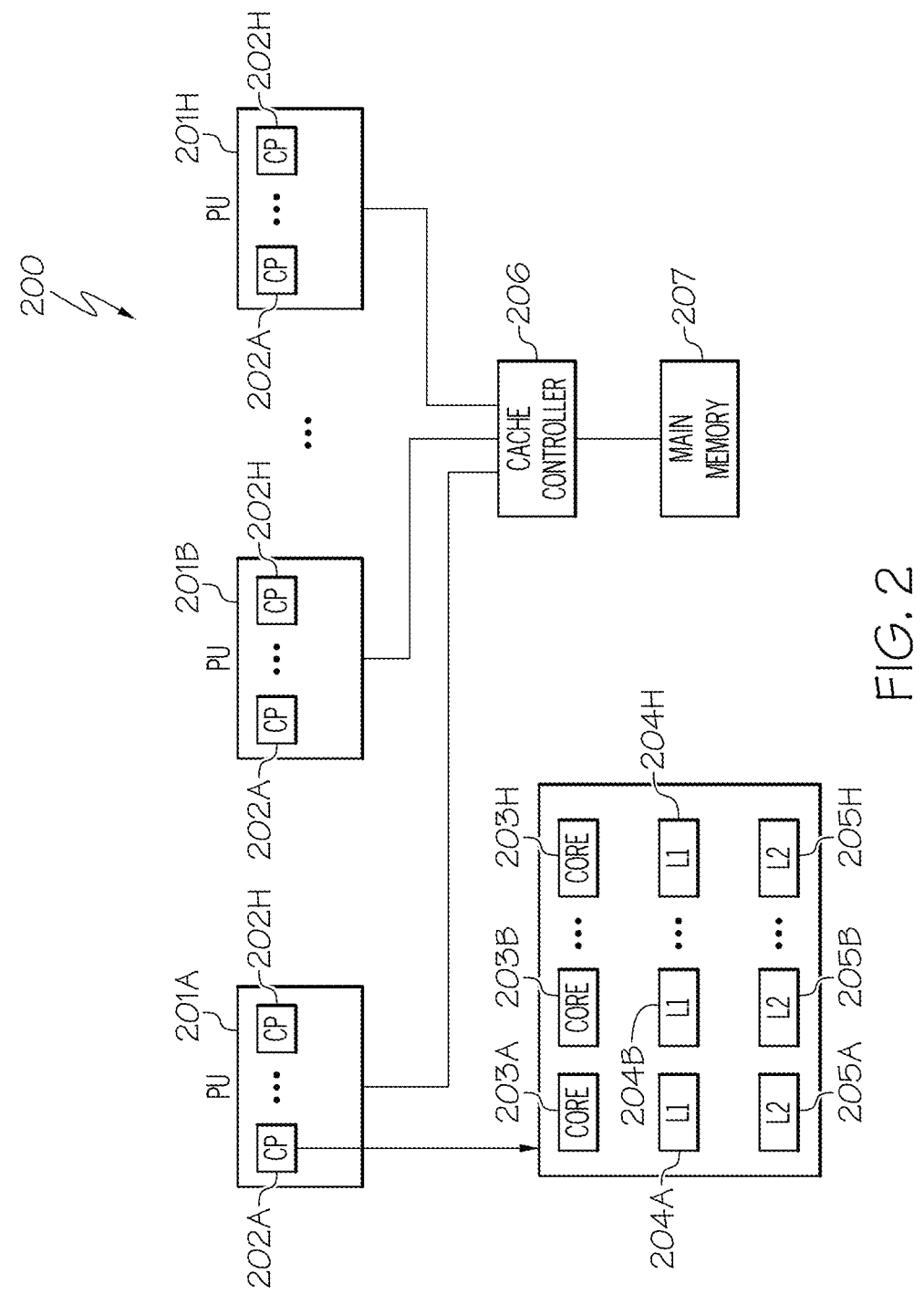
FIG. 2 illustrates a distributed symmetric multiprocessing (SMP) system utilizing cache persistence in accordance with an embodiment of the present disclosure.

FIG. 2 illustrates a distributed symmetric multiprocessing (SMP) system 200 utilizing cache persistence in accordance with an embodiment of the present disclosure. In one embodiment, such a system 200 corresponds to processing circuitry 107, cache 108 of computer 101.

Referring now to FIG. 2, SMP system 200 includes processing units ("PUs") 201A-201H. Processing units 201A-201H may collectively or individually be referred to as processing units (PUs) 201 or processing unit (PU) 201, respectively.

In one embodiment, each processing unit 201 includes eight (8) microprocessor (CP) chips 202A-202H. CP chips 202A-202H may collectively or individually be referred to as CP chips 202 or CP chip 202, respectively. In one embodiment, CP chip 202 corresponds to a single semiconductor chip that integrates the functional units of a computer, such as the arithmetic/logic, control, storage, input, and output.

In one embodiment, each CP chip 202 includes eight (8) cores 203A-203H. Cores 203A-203H may collectively or individually be referred to as cores 203 or core 203, respectively. In one embodiment, core 203 corresponds to a component of the computer's processing unit (e.g., PU 201) that executes instructions and processes data.

In one embodiment, each CP chip 202 further includes L1 (level one) caches 204A-204H (including both instruction cache and data cache). In one embodiment, L1 caches 204A-204H are backed by L2 (level two) caches 205A-205H. L1 caches 204A-204H may collectively or individually be referred to as L1 caches 204 or L1 cache 204, respectively. L2 caches 205A-205H may collectively or individually be referred to as L2 caches 205 or L2 cache 205, respectively. In one embodiment, L2 caches 205 interact to provide an on-chip virtual L3 (level three) cache. In one embodiment, each PU 201 contains up to 8 CP chips 202 with a fully connected topology providing a virtual L4 (level four) cache. The virtual L3 and virtual L4 caches can be implemented through a set of chip caching technologies that cluster the independent physical L2 caches 205 within CP chip 202 and within PU 201 to act as a unified shared victim cache.

In one embodiment, the virtual L3/L4 caches are implemented by defining groups/clusters of L2 caches 205 within CP chip 202, a group of CP chips 202, and/or PUs 201 for evicting cache lines from peer caches. That is to say, a cache line is evicted from a first L2 cache 205 to a peer L2 cache 205 within the defined groups/clusters of L2 caches 205 according to a defined replacement policy. A "peer cache" (also referred to as a "lateral cache"), as used herein, refers to a cache, that is used to persist data (e.g., cache line) that was evicted or cast-out from another cache. For example, such peer caches may be divided in a cluster of caches (e.g., L2 caches 205A-205H in CP 202A of PU 201A form a first cluster and L2 caches 205A-205H in CP 202A of PU 201B form a second cluster), where a cache line in a cache (e.g., L2 cache 205A in CP 202A of PU 201A) is evicted to a peer cache (e.g., L2 cache 205A in CP 202A in PU 201B) in a cluster to be persisted. If such a cache line is further evicted, then the cache line may be further persisted in another cluster until the evicted cache line reaches a last cluster and can be evicted to main memory 207 (e.g., memory 110 of FIG. 1).

Evicting (also referred to as cast-out), as used herein, refers to removing a cache line from a cache (e.g., L2 cache

205A). A cache line, as used herein, refers to a block of memory that a processor loads into a cache when it accesses a part of memory that is not already stored in the cache. The cache line contains the actual data that was fetched from the main memory, as well as a directory store, status information, and an effective memory address.

In one embodiment, the caches discussed herein, such as L1 caches 204, L2 caches 205, are multi-way set-associative caches. A set-associative cache is a cache that is split into "sets" of cache entries or cache lines. Each set may have one or more "ways," where each way is a single cache entry. A multi-way cache is a type of cache memory that allows a memory address to be mapped to multiple ways within the cache.

A description of an LRU vector for tracking the age of the ways (duration of time data associated with the ways was last requested) of the set-associative cache is discussed further below in connection with FIGS. 3-4.

Furthermore, as shown in FIG. 2, system 200 includes a cache controller 206 connected to PUs 201 and main memory 207. In one embodiment, the lateral persistence and replacement policy is implemented using cache controller 206 to manage cache evictions amongst the clusters of caches and evictions to main memory 207. In one embodiment, cache controller 206 can be local within PU 201 or may be a distributed element within an instance per cluster of caches.

In one embodiment, cache controller 206 is configured to implement the LRU mechanism, which is a caching algorithm that removes the least recently used data items from the cache (e.g., L1 cache 204, L2 cache 205) to make room for new data, such as the most recently used data items. Furthermore, cache controller 206 is configured to limit the effects of uncorrected hard errors in the LRU vector as discussed further below in connection with FIGS. 5-7.

Figure 3:
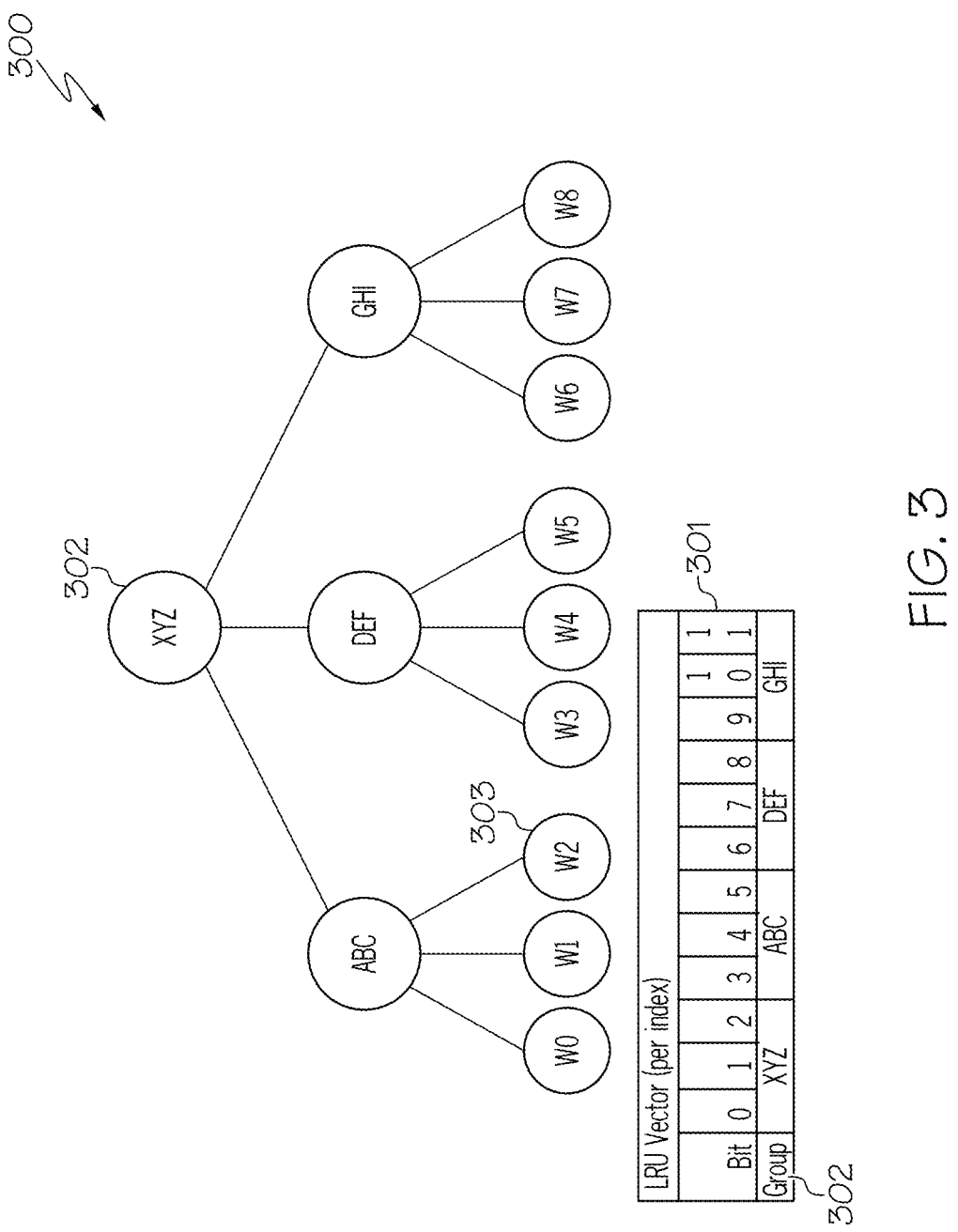
FIG. 3 illustrates a 3-3 tiered LRU algorithm for a 9-way set-associative cache in accordance with an embodiment of the present disclosure.

Referring now to FIG. 3, FIG. 3 illustrates a 3-3 tiered LRU algorithm 300 for a 9-way set-associative cache in accordance with an embodiment of the present disclosure.

As shown in FIG. 3, in conjunction with FIG. 2, caches, such as L1 cache 204, L2 cache 205, may include a LRU vector 301 per index (data structure that helps speed up the process in retrieving information), which is used to track the age of the ways (duration of time data associated with the ways was last requested) of the set-associative cache.

In one embodiment, such caches, such as L1 cache 204, L2 cache 205, are organized as a 9-way set-associative cache. In such an embodiment, a tiered or hierarchical LRU algorithm 300 is utilized to implement the LRU algorithm. For example, for 3-3 tiered LRU algorithm 300, only 12 bits (see bits 0 to 11 in LRU vector 301) are needed to implemented the LRU algorithm, whereas, 36 bits would normally be needed to implement a straight 9-way LRU algorithm.

As shown in FIG. 3, such a 3-3 tiered LRU algorithm 300 for a 9-way set-associative cache utilizes groups of bits 302 (may be referred to herein as simply "groups") at specific tiers of LRU vector 301 to identify specific ways of the multi-way set-associative cache. For example, as shown in FIG. 3, groups 302 are represented by nodes, such as XYZ, ABC, DEF, and GHI, which are each a parent to three children represented by nodes, which may correspond to other groups 302 or ways 303, identified as W0 . . . W8, representing the 9 ways in the 9-way set-associative cache. For example, group XYZ has three children, groups ABC, DEF, and GHI. Group ABC has three children, such as ways W0, W1, and W2. Group DEF has three children, such as ways W3, W4, and W5. Group GHI has three children, such as ways W6, W7, and W8.

By utilizing a tiered LRU algorithm, such as a 3-3 tiered LRU algorithm 300, a most recently used data item may be installed without requiring a read-modify-write. A read-modify-write operation involves both reading a memory location and writing a new value into it simultaneously. The read-modify-write operation does not need to be performed since only one of the levels of the 3-3 tiered LRU algorithm 300 needs to be updated to set the target way to include the most recently used data item at that level.

Another embodiment of utilizing a tiered or hierarchical LRU algorithm for a multi-way set-associative cache is discussed below in connection with FIG. 4.

Figure 4:
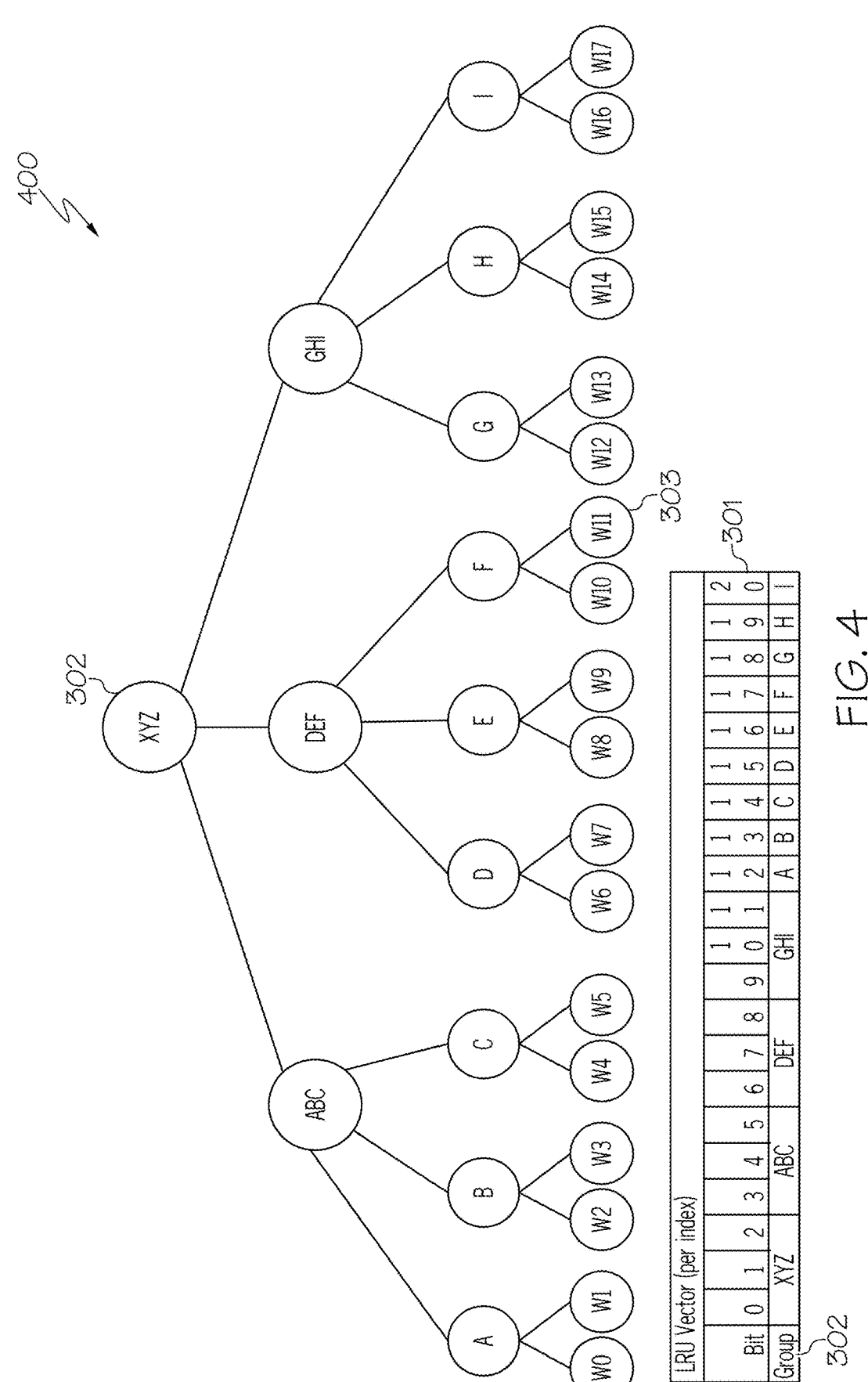
FIG. 4 illustrates a 3-3-2 tiered LRU algorithm for an 18-way set-associative cache in accordance with an embodiment of the present disclosure.

FIG. 4 illustrates a 3-3-2 tiered LRU algorithm 400 for an 18-way set-associative cache in accordance with an embodiment of the present disclosure.

As shown in FIG. 4, in conjunction with FIG. 2, caches, such as L1 cache 204, L2 cache 205, may include a LRU vector 301 per index (data structure that helps speed up the process in retrieving information), which is used to track the age of the ways (duration of time data associated with the ways was last requested) of the set-associative cache.

In one embodiment, such caches, such as L1 cache 204, L2 cache 205, are organized as an 18-way set-associative cache. In such an embodiment, a tiered or hierarchical LRU algorithm 400 is utilized to implement the LRU algorithm. For example, for 3-3-2 tiered LRU algorithm 400, only 21 bits (see bits 0 to 20 in LRU vector 301) are needed to implemented the LRU algorithm, whereas, 153 bits would normally be needed to implement a straight 18-way LRU algorithm.

As shown in FIG. 4, such a 3-3-2 tiered LRU algorithm 400 for an 18-way set-associative cache utilizes groups of bits 302 at specific tiers of LRU vector 301 to identify specific ways of the multi-way set-associative cache. In particular, such a 3-3-2 tiered LRU algorithm 400 is implemented using four 3-way LRUs (e.g., groups XYZ, ABC, DEF, and GHI) and 9 two-way LRUs (groups A, B, C, D, E, F, G, H, and I). For example, as shown in FIG. 3, groups 302 implemented using 3-way LRUs, such as XYZ, ABC, DEF, and GHI, are each a parent to three children represented by nodes, such as other groups 302. For example, group XYZ has three children, groups ABC, DEF, and GHI. Group ABC has three children, such as groups A, B, and C. Group DEF has three children, such as groups D, E, and F. Group GHI has three children, such as groups G, H, and I. Furthermore, as shown in FIG. 3, groups 302 implemented using 2-way LRUs, such as groups A, B, C, D, E, F, G, H, and I, are each a parent to two children represented by nodes, which correspond to two ways 303, identified as W0 . . . W17, representing the 18 ways in the 18-way set-associative cache. For example, group A has two children, such as ways W0, and W1. Group B has two children, such as ways W2, and W3. Group C has two children, such as ways W4, and W5. Group D has two children, such as ways W6, and W7. Group E has two children, such as ways W8, and W9. Group F has two children, such as ways W10, and W11. Group G has two children, such as ways W12, and W13. Group H has two children, such as ways W14, and W15. Group I has two children, such as ways W16, and W17.

By implementing such a tiered LRU algorithm, when a soft error is detected, such as a no-select error, in one of the 3-way LRUs, and such a soft error has occurred in such a portion of LRU vector 301 a number of times that exceeds a threshold value, it is assumed that such a portion of LRU vector 301 is subject to a hard error. In response to such an event, the subsequent correct write updates only 3 bits of LRU vector 301 to a constant pattern (e.g., all 0's) as opposed to updating the entirety of LRU vector 301 (e.g., writing a constant for the bit values of the entire LRU vector 301). The most recently used update is then applied to all non-error fields (i.e., non-error associated groups 302) of LRU vector 301 thereby limiting the effects of uncorrected hard errors.

A discussion regarding the software components used by cache controller 206 to limit the effects of uncorrected hard errors in the LRU vector (e.g., LRU vector 301) is provided below in connection with FIG. 5.

FIG. 5 is a diagram of the software components used by cache controller 206 to limit the effects of uncorrected hard errors in the LRU vector (e.g., LRU vector 301) in accordance with an embodiment of the present disclosure.

Referring to FIG. 5, in conjunction with FIGS. 1-4, cache controller 206 includes a detecting engine 501 configured to receive a LRU read operation of LRU vector 301. In one embodiment, such a read operation is utilized to select a group 302 at each tier (hierarchy) of LRU algorithm 300, 400 in connection with identifying the location of the way of the multi-way set-associative cache storing the data item that was least recently read from the cache.

In one embodiment, in response to the LRU read operation, detecting engine 501 determines the least recently used (LRU) selection for each group 302 at each tier of LRU algorithm 300, 400. In one embodiment, such a selection is based on reading the value stored in LRU vector 301 identifying a group 302 at each tier of LRU algorithm 300, 400 corresponding to the location of the least recently used data item in the cache.

In one embodiment, detecting engine 501 determines if there is a valid selection for each group 302 at each tier of LRU algorithm 300, 400. A valid selection, as used herein, refers to a correct encoding of the way of the multi-way set-associative cache containing the data item that is least recently used by the cache. An invalid encoding is said to result in a "no-select" error, which corresponds to a soft error or a soft-fail error. In one embodiment, an invalid encoding is detected if the way identified as being the least recently used cannot be the oldest in age with respect to the other ways of the multi-way set-associative cache. Such a way is referred to herein as the "errant way." Furthermore, such a soft error may correspond to a hard error in LRU vector 301 that is repeatedly detected and corrected with the same pattern. As discussed further below, such a hard error is corrected in a manner involving a corrective write update (e.g., writing a constant pattern) only to a particular portion or location of LRU vector 301 (e.g., only 3 bits of LRU vector 301) while applying the most recently used update to all the non-error fields of LRU vector 301 thereby limiting the effects of uncorrected hard errors as discussed further below.

In one embodiment, cache controller 206 further includes recording engine 502 configured to record the index (data structure that helps speed up the process in retrieving information) of LRU vector 301 subject to the soft error. In one embodiment, such a recordation may occur in a data structure (e.g., table) storing such information. In one embodiment, such a data structure resides within the storage device (e.g., 111, 115) of computer 101. In this manner, LRU vector 301 that was subject to the soft error will be identified upon performing the LRU update operation to set the target way as storing the most recently used data item.

Furthermore, in one embodiment, recording engine 502 records the group(s) 302 at the tier(s) of LRU vector 301 subject to the soft error, where such a group(s) 302 are referred to as the errant group(s). In one embodiment, such a recordation may occur in a data structure (e.g., table) storing such information. In one embodiment, such a data structure resides within the storage device (e.g., 111, 115) of computer 101. For example, if group 302 corresponding to group DEF of LRU algorithm 400 was subject to the soft error, then such a group 302 will be recorded by recording engine 502. In this manner, in connection with performing the LRU update operation to set the target way as storing the most recently used data item, an error correction process, such as a corrective write update (e.g., constant pattern, such as 0's), will only be applied to such a group if the count of the number of soft errors involving such a group 302 (e.g., DEF) in LRU vector 301 exceeds a threshold value.

Additionally, in one embodiment, recording engine 502 updates a counter tracking the number of soft errors involving the errant group(s) 302 of LRU vector 301 (i.e., involving the group(s) 302 at the tier(s) of LRU vector 301 subject to the soft error). For example, such a counter may be updated by increasing the value of the counter by 1. In one embodiment, such a counter may be implemented in software or hardware.

Furthermore, in one embodiment, recording engine 502 sets the error correction pending indicator, which is used to identify LRU vector 301 as potentially needing error correction to occur. In one embodiment, such an error correction pending indicator may correspond to a designated bit in an error field, which is set to a value of 1, to set the error correction pending indicator. If the value of such a bit in the error field is set to the value of 0, then the error correction pending indicator is not set, i.e., the indicator is off.

Cache controller 206 additionally includes reporting engine 503 configured to randomly select a group 302 of LRU vector 301 with the errant way selection. For example, if way W7 of tiered LRU algorithm 300 was errantly selected as storing the least recently used data, then a group 302, such as DEF of tiered LRU algorithm 300 may be selected. Such an operation is performed because errant way selection for LRU reads with detected soft errors have shown to have better performance than choosing the leftmost available ways 303. For instance, in the past, if a soft error was detected for every LRU read operation, then the LRU would select its leftmost available way. As a result, the determination would be skewed towards the lower number ways 303 in LRU algorithm 300.

Furthermore, reporting engine 503 is configured to report the LRU way (e.g., way W7 of tiered LRU algorithm 300) for the new cache line installation to thereby store the most recently used data item. In one embodiment, such an LRU way corresponds to the way of the multi-way set-associative cache that was validly selected by the LRU read operation corresponding to a valid selection for each group 302 at each tier of LRU algorithm 300, 400. In one embodiment, such an LRU way corresponds to the way of the multi-way set-associative cache that was invalidly selected by the LRU read operation corresponding to an invalid selection for each group 302 at each tier of LRU algorithm 300, 400.

In one embodiment, the LRU way for the new cache line installation is reported to updating engine 504 of cache controller 206 to update this way (referred to herein as the target way) with the most recently used data item as discussed below.

In one embodiment, updating engine 504 receives an LRU update operation to modify the target way to include the most recently used data item. For example, the least recently used data item in the multi-way set-associative cache was evicted to make room for new data, such as the most recently used data item. Such new data is to be stored in the way that was reported by reporting engine 503 for the new cache line installation.

In one embodiment, updating engine 504 determines if the error correction pending indicator is set. As discussed above, recording engine 502 sets the error correction pending indicator, which is used to identify LRU vector 301 as potentially needing error correction to occur, in response to the LRU read operation of LRU vector 301 making an invalid selection for each group 302 at each tier of LRU algorithm 300, 400.

If the error correction pending indicator is not set thereby indicating that error correction does not need to be implemented, then updating engine 504 sets the target way to include the most recently used data item in all the associated groups 302 of LRU vector 301. For example, if the target way of W6 of tiered LRU algorithm 300 needs to be updated to set the target way to include the most recently used data item, then updating engine 504 sets the target way to include the most recently used data item in all the associated groups 302 (e.g., XYZ and GHI) of LRU vector 301.

In one embodiment, updating engine 504 may then write the data of LRU vector 301 in the associated LRU array index, which is a data structure that helps speed up the process in retrieving information. For example, by writing the data of LRU vector 301 in the LRU array index for the target way, such information may be used to identify the new and the old data faster.

If, however, the error correction pending indicator is set, then updating engine 504 determines if the accessed index is the same as the index subject to the soft error.

As previously discussed, recording engine 502 records the index (data structure that helps speed up the process in retrieving information) of LRU vector 301 subject to the soft error. If such an index does not match the accessed index by the LRU update operation, then LRU vector 301 of the accessed index is not subject to a soft error. As a result, updating engine 504 may then set the target way to include the most recently used data item in all the associated groups 302 (e.g., XYZ and GHI) of LRU vector 301 as discussed above.

If, however, the accessed index by the LRU update operation matches the failing index (index recorded by recording engine 502 as being subject to the soft error), then LRU vector 301 of the accessed index is subject to a soft error.

As a result, updating engine 504 determines if the value of the counter tracking the number of soft errors occurring in the errant group 302 of LRU vector 301 exceeds a threshold value, which may be user-designated.

If the value of the counter does not exceed the threshold value, then the soft error will not be deemed to be a hard error. As a result, updating engine 504 may then set the target way to include the most recently used data item in all the associated groups 302 (e.g., XYZ and GHI) of LRU vector 301 as discussed above.

If, however, the value of the counter exceeds the threshold value, then it is assumed that such a location in LRU vector 301 (e.g., errant group 302) is subject to a hard error as opposed to a soft error and an error correction process for only the affected location of LRU vector 301 (e.g., group 302, such as GHI of LRU algorithm 300) is then pursued.

As a result, updating engine 504 implements an error correction process only for the group(s) 302 at the tier(s) of LRU vector 301 subject to the error. For example, updating engine 504 writes a constant pattern (e.g., 0's) in all errant group(s) 302 at the tier(s) of LRU vector 301 to address the error. For instance, updating engine 504 correctively writes only to the 3-bit vector of the errant group 302 (e.g., GHI of LRU algorithm 300).

Furthermore, updating engine 504 sets the target way to include the most recently used data item in the non-error associated groups 302 (e.g., XYZ of LRU algorithm 300) of LRU vector 301 followed by writing the data of LRU vector 301 in the associated LRU array index. The non-error associated groups 302, as used herein, refer to those groups 302 that are related to the errant way of the multi-way set-associative cache but were not subject to the soft error. For example, if way W6 of LRU algorithm 300 was an errant way and group GHI was the only group 302 subject to the soft error, then group XYZ would be a non-error associated group 302 as illustrated in FIG. 3.

By only applying a constant value to the location of LRU vector 301 having the error and setting the target way to include the most recently used data item in the other locations of LRU vector 301 (e.g., non-error associated groups 302 of LRU vector 301), the effects of uncorrected hard errors of LRU vector 301 are limited.

Figure 6:
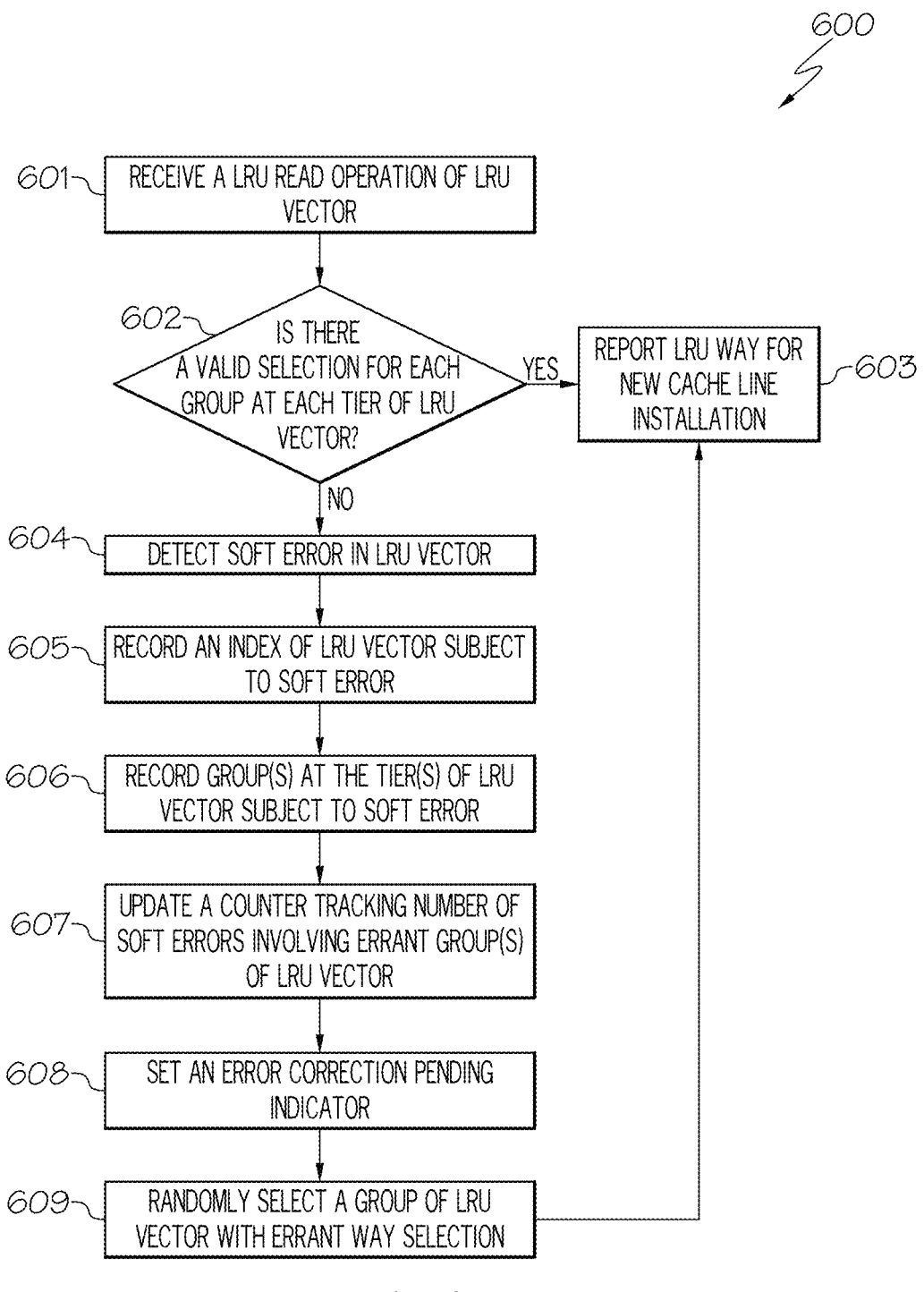
FIG. 6 is a flowchart of a method for the LRU vector read with error recording in accordance with an embodiment of the present disclosure.

A discussion regarding the method for limiting the effects of uncorrected hard errors of the LRU vector (e.g., LRU vector 301) is provided below in connection with FIGS. 6 and 7. FIG. 6 is a flowchart of a method for the LRU vector read with error recording. FIG. 7 is a flowchart of a method for the LRU vector update with error correction.

As stated above, FIG. 6 is a flowchart of a method 600 for the LRU vector read with error recording in accordance with an embodiment of the present disclosure.

Referring to FIG. 6, in conjunction with FIGS. 1-5, in step 601, detecting engine 501 of cache controller 206 receives a LRU read operation of LRU vector 301.

As discussed above, in one embodiment, such a read operation is utilized to select a group 302 at each tier (hierarchy) of LRU algorithm 300, 400 in connection with identifying the location of the way of the multi-way set-associative cache storing the data item that was least recently read from the cache.

In step 602, in response to the LRU read operation, detecting engine 501 of cache controller 206 determines if there is a valid selection for each group 302 at each tier of LRU algorithm 300, 400 by the LRU read operation.

As stated above, in one embodiment, such a selection is based on reading the value stored in LRU vector 301 identifying a group 302 at each tier of LRU algorithm 300, 400 corresponding to the location of the least recently used data item in the cache.

Furthermore, as discussed above, a valid selection, as used herein, refers to a correct encoding of the way of the multi-way set-associative cache containing the data item that is least recently used by the cache. An invalid encoding is said to result in a "no-select" error, which corresponds to a soft error or a soft-fail error. In one embodiment, an invalid encoding is detected if the way identified as being the least recently used cannot be the oldest in age with respect to the other ways of the multi-way set-associative cache. Such a way is referred to herein as the "errant way." Furthermore, such a soft error may correspond to a hard error in LRU vector 301 that is repeatedly detected and corrected with the same pattern. Such a hard error is corrected in a manner involving a corrective write update (e.g., writing a constant pattern) only to a particular portion or location of LRU vector 301 (e.g., only 3 bits of LRU vector 301) while applying the most recently used update to all the non-error fields of LRU vector 301 thereby limiting the effects of uncorrected hard errors.

If there is a valid selection for each group 302 at each tier of LRU algorithm 300, 400 by the LRU read operation, then, in step 603, reporting engine 503 of cache controller 206 reports the LRU way (e.g., way W7 of LRU algorithm 300) for the new cache line installation to thereby store the most recently used data item.

As discussed above, in one embodiment, such an LRU way corresponds to the way of the multi-way set-associative cache that was validly selected by the LRU read operation corresponding to a valid selection for each group 302 at each tier of LRU algorithm 300, 400.

In one embodiment, the LRU way for the new cache line installation is reported to updating engine 504 of cache controller 206 to update this way (referred to herein as the target way) with the most recently used data item.

If, however, there is not a valid selection for each group 302 at each tier of LRU algorithm 300, 400 by the LRU read operation, then, in step 604, recording engine 502 detects a soft error in LRU vector 301.

In step 605, recording engine 502 of cache controller 206 records the index (data structure that helps speed up the process in retrieving information) of LRU vector 301 subject to the soft error.

As stated above, in one embodiment, such a recordation may occur in a data structure (e.g., table) storing such information. In one embodiment, such a data structure resides within the storage device (e.g., 111, 115) of computer 101. In this manner, LRU vector 301 that was subject to the soft error will be identified upon performing the LRU update operation to set the target way as storing the most recently used data item.

In step 606, recording engine 502 of cache controller 206 records the group(s) 302 at the tier(s) of LRU vector 301 subject to the soft error.

As discussed above, in one embodiment, such a recordation may occur in a data structure (e.g., table) storing such information. In one embodiment, such a data structure resides within the storage device (e.g., 111, 115) of computer 101. For example, if group 302 corresponding to group DEF of LRU algorithm 400 was subject to the soft error, then such a group 302 will be recorded by recording engine 502. In this manner, in connection with performing the LRU update operation to set the target way as storing the most recently used data item, an error correction process, such as a corrective write update (e.g., constant pattern, such as 0's), will only be applied to such a group if the count of the number of soft errors involving such a group 302 (e.g., DEF) in LRU vector 301 exceeds a threshold value.

In step 607, recording engine 502 of cache controller 206 updates a counter tracking the number of soft errors involving the errant group(s) 302 of LRU vector 301 (i.e., involving the group(s) 302 at the tier(s) of LRU vector 301 subject to the soft error). For example, such a counter may be updated by increasing the value of the counter by 1.

As stated above, in one embodiment, such a counter may be implemented in software or hardware.

In step 608, recording engine 502 of cache controller 206 sets the error correction pending indicator, which is used to identify LRU vector 301 as potentially needing error correction to occur.

As discussed above, in one embodiment, such an error correction pending indicator may correspond to a designated bit in an error field, which is set to a value of 1, to set the error correction pending indicator. If the value of such a bit in the error field is set to the value of 0, then the error correction pending indicator is not set, i.e., the indicator is off.

In step 609, reporting engine 503 of cache controller 206 randomly selects a group 302 of LRU vector 301 with the errant way selection. For example, if way W7 of LRU algorithm 300 was errantly selected as storing the least recently used data, then a group, such as DEF 302 of tiered LRU algorithm 300 may be selected.

Upon selecting a group 302 of LRU vector 301 with the errant way selection, reporting engine 503 reports the LRU way (e.g., way W7 of LRU algorithm 300) for the new cache line installation to thereby store the most recently used data item in step 603. Such an LRU way corresponds to the way of the multi-way set-associative cache that was invalidly selected by the LRU read operation corresponding to an invalid selection for each group 302 at each tier of LRU algorithm 300, 400.

In one embodiment, the LRU way for the new cache line installation is reported to updating engine 504 of cache controller 206 to update this way (referred to herein as the target way) with the most recently used data item as discussed below in connection with FIG. 7.

FIG. 7 is a flowchart of a method 700 for the LRU vector update with error correction in accordance with an embodiment of the present disclosure.

Referring to FIG. 7, in conjunction with FIGS. 1-6, in step 701, updating engine 504 of cache controller 206 receives a LRU update operation to modify the target way to include the most recently used data item. For example, the least recently used data item in the multi-way set-associative cache was evicted to make room for new data, such as the most recently used data item. Such new data is to be stored in the way that was reported by reporting engine 503 for the new cache line installation.

In step 702, updating engine 504 of cache controller 206 determines if the error correction pending indicator is set.

As discussed above, recording engine 502 sets the error correction pending indicator, which is used to identify LRU vector 301 as potentially needing error correction to occur, in response to the LRU read operation of LRU vector 301 making an invalid selection for each group at each tier of LRU algorithm 300, 400.

If the error correction pending indicator is not set thereby indicating that error correction does not need to be implemented, then, in step 703, updating engine 504 of cache controller 206 sets the target way to include the most recently used data item in all the associated groups 302 of LRU vector 301. For example, if the target way of W6 of tiered LRU algorithm 300 needs to be updated to set the target way to include the most recently used data item, then updating engine 504 sets the target way to include the most recently used data item in all the associated groups 302 (e.g., XYZ and GHI) of LRU vector 301.

In step 704, updating engine 504 of cache controller 206 writes the data of LRU vector 301 in the associated LRU array index, which is a data structure that helps speed up the process in retrieving information. For example, by writing the data of LRU vector 301 in the LRU array index for the target way, such information may be used to identify the new and the old data faster.

If, however, the error correction pending indicator is set, then, in step 705, updating engine 504 of cache controller 206 determines if the accessed index is the same as the index subject to the soft error.

As previously discussed, recording engine 502 records the index of LRU vector 301 subject to the soft error. If such an index does not match the accessed index by the LRU update operation, then LRU vector 301 of the accessed index is not subject to a soft error. As a result, updating engine 504 of cache controller 206 sets the target way to include the most recently used data item in all the associated groups 302 (e.g., XYZ and GHI) of LRU vector 301 as discussed above in connection with step 703.

If, however, the accessed index by the LRU update operation matches the failing index (index recorded by recording engine 502 as being subject to the soft error), then LRU vector 301 of the accessed index is subject to a soft error.

As a result, in step 706, updating engine 504 of cache controller 206 determines if the value of the counter tracking the number of soft errors occurring in the errant location (i.e., errant group 302) of LRU vector 301 exceeds a threshold value, which may be user-designated.

If the value of the counter does not exceed the threshold value, then the soft error will not be deemed to be a hard error. As a result, updating engine 504 may then set the target way to include the most recently used data item in all the associated groups 302 (e.g., XYZ and GHI) of LRU vector 301 as discussed above in step 703.

If, however, the value of the counter exceeds the threshold value, then it is assumed that such a location in LRU vector 301 (e.g., errant group 302) is subject to a hard error as opposed to a soft error. As a result, in step 707, updating engine 504 of cache controller 206 implements an error correction process for only the affected location of LRU vector 301 (e.g., group 302, such as GHI of LRU algorithm 300). For example, updating engine 504 writes a constant pattern (e.g., 0's) in all errant group(s) 302 at the tier(s) of LRU vector 301 to address the error. For instance, updating engine 504 correctively writes only to the 3-bit vector of the errant group 302 (e.g., GHI of LRU algorithm 300).

In step 708, updating engine 504 of cache controller 206 sets the target way to include the most recently used data item in the non-error associated groups 302 of LRU vector 301 (e.g., XYZ of LRU algorithm 300) followed by writing the data of LRU vector 301 in the associated LRU array index in step 704.

As discussed above, the non-error associated groups 302, as used herein, refer to those groups 302 that are related to the errant way of the multi-way set-associative cache but were not subject to the soft error. For example, if way W6 of LRU algorithm 300 was an errant way and group GHI was the only group 302 subject to the soft error, then group XYZ would be a non-error associated group 302 as illustrated in FIG. 3.

By only applying a constant value to the location of LRU vector 301 having the error and setting the target way to include the most recently used data item in the other locations of LRU vector 301 (e.g., non-error associated groups 302 of LRU vector 301), the effects of uncorrected hard errors of LRU vector 301 are limited.

Furthermore, the principles of the present disclosure improve the technology or technical field involving least recently used (LRU) mechanisms.

As discussed above, LRU mechanisms are fault tolerant (system's ability to continue operating normally even when a fault occurs) as long as an entry in the cache is selected for eviction and any error correction mechanism does not tend to repeatedly select a single or small subset of the ways in the multi-way set-associative cache. An error correction mechanism is a method for detecting and correcting errors, including errors in an LRU vector tracking the age of the ways (duration of time data associated with the ways was last requested) of the set-associative cache. For example, an error correction mechanism may detect a "soft" error, such as a no-select scenario in which encodings as to the ages of the ways of the multi-way set-associative cache with respect to each other are in error. Soft errors, also known as transient errors, stem from incorrect data or signal states due to external disturbances. Such an error is corrected by writing 0's or some other constant for the bit values of the LRU vector to refresh a potential soft error. A problem occurs if there is a hard error in the LRU vector that is repeatedly detected and corrected with the same pattern (e.g., writing 0's for the bit values of the LRU vector). Hard errors, also referred to as permanent errors, may result from actual damage, such as a broken transistor or a stuck-at fault in a signal. In such a scenario, every other access to the affected index (used to identify which location of the LRU vector is associated with a particular way of the multi-way set-associative cache) will result in the selection for the same set identifier. Such a problem is exacerbated if the hard failure is a bit line defect thereby affecting multiple indices. By repeatedly writing the same pattern at the same location in the LRU vector to attempt to cure soft errors, the set associativity (a given source address maps to one of N unique locations) of the cache is limited over time.

Embodiments of the present disclosure improve such technology by detecting a soft error in the LRU vector. A group at the tier of the LRU vector subject to the error is then recorded. A counter tracking the number of soft errors involving the errant group of the LRU vector (i.e., involving the group at the tier of the LRU vector subject to the soft error) is updated (e.g., increased by a value of 1). If the value of the counter exceeds a threshold value, then such a soft error is deemed to be treated as a hard error. In such a situation, an error correction process is implemented for only the affected location of the LRU vector. That is, an error correction process is only implemented for the group at the tier of the LRU vector subject to the soft error in response to the value of the counter exceeding the threshold value. For example, a constant pattern (e.g., 0's) is written in the errant group at the tier of the LRU vector to address the error. The target way is then set to include the most recently used data item in the non-errant associated groups of the LRU vector. In this manner, the effects of uncorrected hard errors of the LRU vector is limited by only correctively updating the bits of the LRU vector associated with the error deemed to be a hard error as opposed to updating the entirety of the LRU vector (e.g., writing a constant pattern for the bit values of the entire LRU vector) to address the error. Furthermore, in this manner, there is an improvement in the technical field involving LRU mechanisms.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for limiting the effects of uncorrected hard errors, the method comprising:

detecting a soft error in a least recently used (LRU) vector;

recording a group at a tier of said LRU vector subject to said soft error;

updating a counter tracking a number of soft errors involving said group at said tier of said LRU vector;

implementing an error correction process only for said group at said tier of said LRU vector subject to said soft error in response to a value of said counter exceeding a threshold value; and setting a target way to include a most recently used data item in non-error associated groups of said LRU vector.

2. The method as recited in claim 1, wherein said LRU vector is a hierarchical tiered LRU vector.

3. The method as recited in claim 1 further comprising:

receiving a LRU read operation of said LRU vector;

determining if there is a valid selection for each group at each tier of said LRU vector;

recording an index of said LRU vector in response to an invalid selection; and recording said group at said tier of said LRU vector subject to said soft error in response to said invalid selection.

4. The method as recited in claim 3 further comprising:

receiving an LRU update operation to modify said target way to include said most recently used data item.

5. The method as recited in claim 4 further comprising:

implementing said error correction process only for said group at said tier of said LRU subject to said soft error in response to said value of said counter exceeding said threshold value and in response to an accessed index of said LRU update operation corresponding to said recorded index of said LRU vector.

6. The method as recited in claim 5 further comprising:

writing data of said LRU vector in an associated LRU array index.

7. The method as recited in claim 4 further comprising:

setting said target way to include said most recently used data item in all associated groups of said LRU vector in response to an accessed index of said LRU update operation not corresponding to said recorded index of said LRU vector.

8. A computer program product for limiting the effects of uncorrected hard errors, the computer program product comprising one or more computer readable storage mediums having program code embodied therewith, the program code comprising programming instructions for:

detecting a soft error in a least recently used (LRU) vector;

recording a group at a tier of said LRU vector subject to said soft error;

updating a counter tracking a number of soft errors involving said group at said tier of said LRU vector;

implementing an error correction process only for said group at said tier of said LRU vector subject to said soft error in response to a value of said counter exceeding a threshold value; and setting a target way to include a most recently used data item in non-error associated groups of said LRU vector.

9. The computer program product as recited in claim 8, wherein said LRU vector is a hierarchical tiered LRU vector.

10. The computer program product as recited in claim 8, wherein the program code further comprises the programming instructions for:

receiving a LRU read operation of said LRU vector;

determining if there is a valid selection for each group at each tier of said LRU vector;

recording an index of said LRU vector in response to an invalid selection; and recording said group at said tier of said LRU vector subject to said soft error in response to said invalid selection.

11. The computer program product as recited in claim 10, wherein the program code further comprises the programming instructions for:

receiving an LRU update operation to modify said target way to include said most recently used data item.

12. The computer program product as recited in claim 11, wherein the program code further comprises the programming instructions for:

implementing said error correction process only for said group at said tier of said LRU subject to said soft error in response to said value of said counter exceeding said threshold value and in response to an accessed index of said LRU update operation corresponding to said recorded index of said LRU vector.

13. The computer program product as recited in claim 12, wherein the program code further comprises the programming instructions for:

writing data of said LRU vector in an associated LRU array index.

14. The computer program product as recited in claim 11, wherein the program code further comprises the programming instructions for:

setting said target way to include said most recently used data item in all associated groups of said LRU vector in response to an accessed index of said LRU update operation not corresponding to said recorded index of said LRU vector.

15. A system, comprising:

a memory for storing a computer program for limiting the effects of uncorrected hard errors; and a processor connected to said memory, wherein said processor is configured to execute program instructions of the computer program comprising:

detecting a soft error in a least recently used (LRU) vector;

recording a group at a tier of said LRU vector subject to said soft error;

updating a counter tracking a number of soft errors involving said group at said tier of said LRU vector;

implementing an error correction process only for said group at said tier of said LRU vector subject to said soft error in response to a value of said counter exceeding a threshold value; and setting a target way to include a most recently used data item in non-error associated groups of said LRU vector.

16. The system as recited in claim 15, wherein said LRU vector is a hierarchical tiered LRU vector.

17. The system as recited in claim 15, wherein the program instructions of the computer program further comprise:

receiving a LRU read operation of said LRU vector;

determining if there is a valid selection for each group at each tier of said LRU vector;

recording an index of said LRU vector in response to an invalid selection; and recording said group at said tier of said LRU vector subject to said soft error in response to said invalid selection.

18. The system as recited in claim 17, wherein the program instructions of the computer program further comprise:

receiving an LRU update operation to modify said target way to include said most recently used data item.

19. The system as recited in claim 18, wherein the program instructions of the computer program further comprise:

implementing said error correction process only for said group at said tier of said LRU subject to said soft error in response to said value of said counter exceeding said threshold value and in response to an accessed index of said LRU update operation corresponding to said recorded index of said LRU vector.

20. The system as recited in claim 19, wherein the program instructions of the computer program further comprise:

writing data of said LRU vector in an associated LRU array index.

* * * * *